July 10, 1962 R. S. ZEBARTH 3,043,319
APPARATUS FOR FREEZING FOOD PRODUCTS
Original Filed Dec. 16, 1957 3 Sheets-Sheet 1
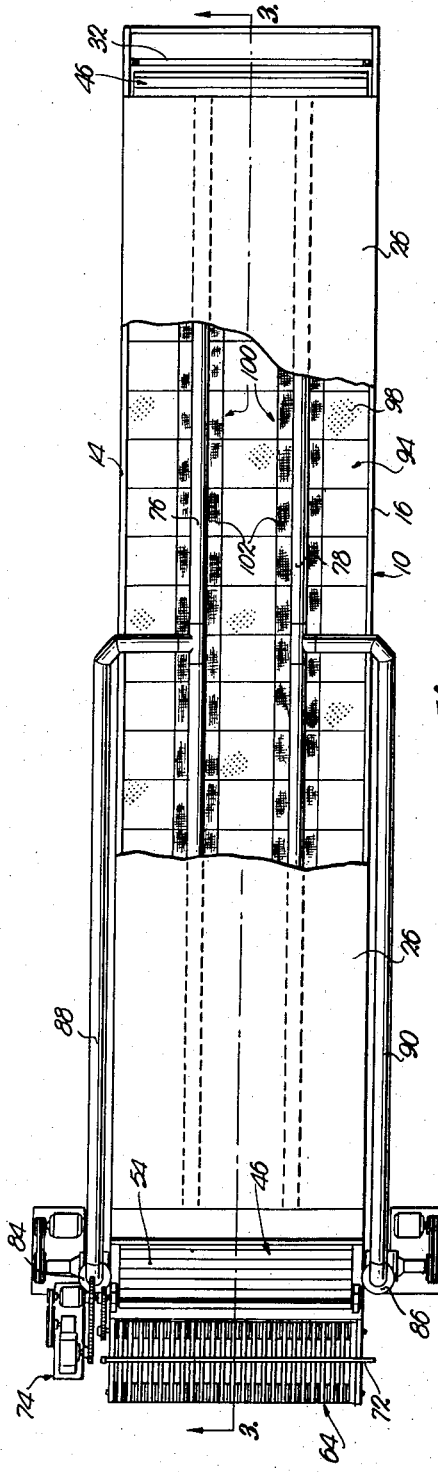
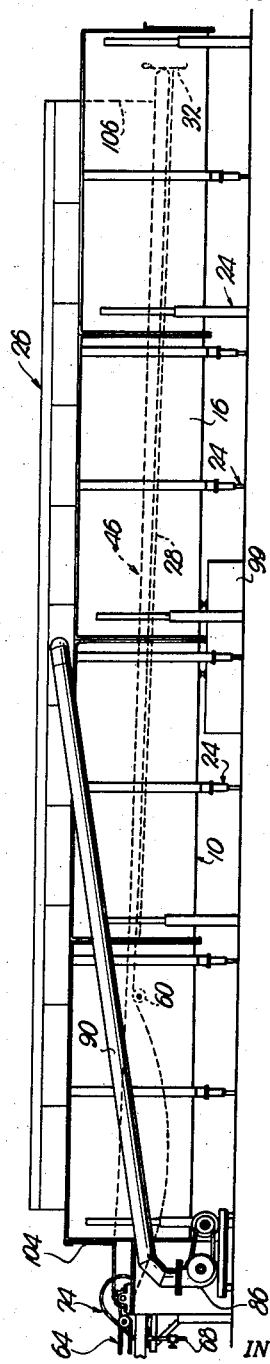
INVENTOR.
Ralph S. Zebarth
BY
ATTORNEY.

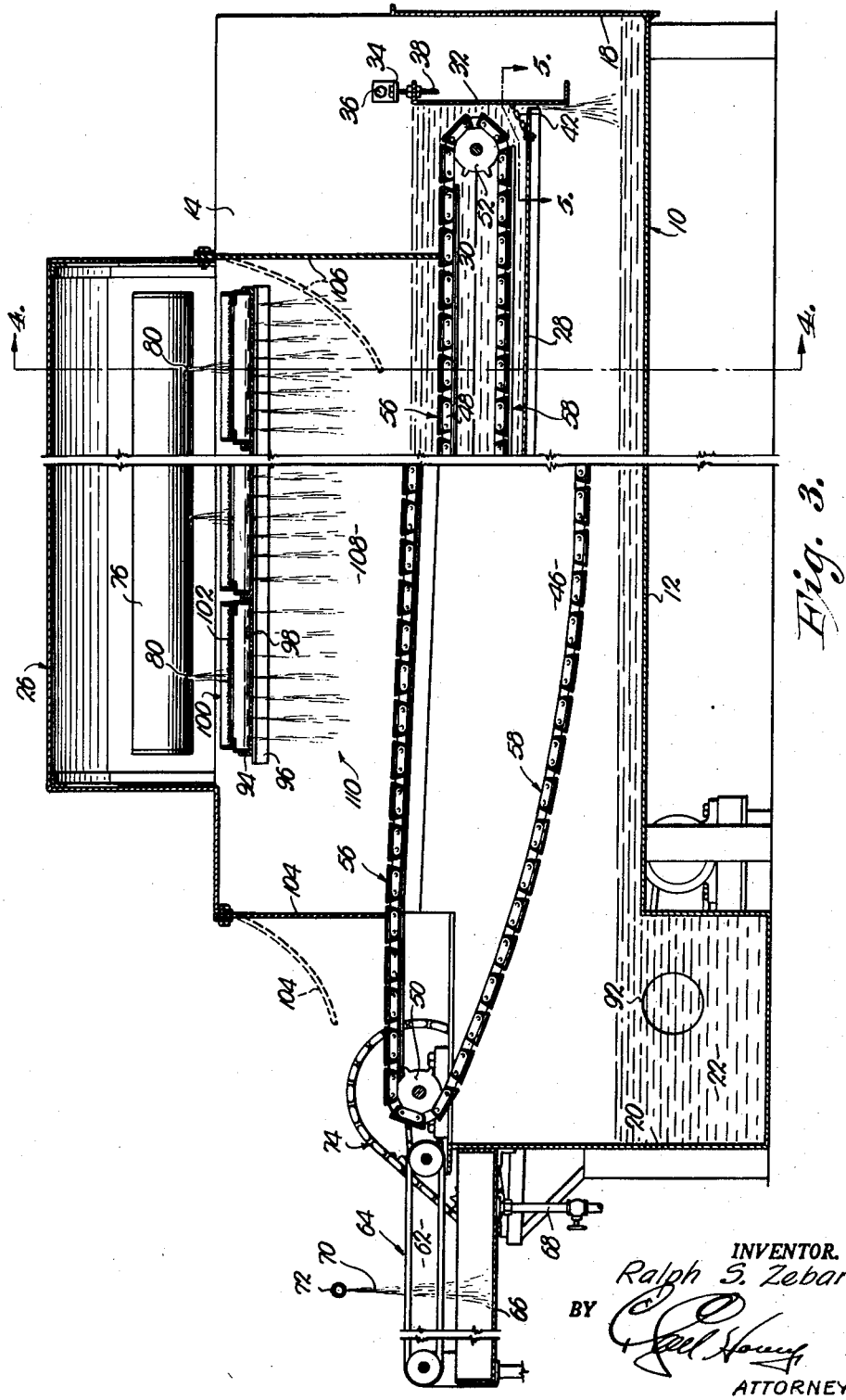

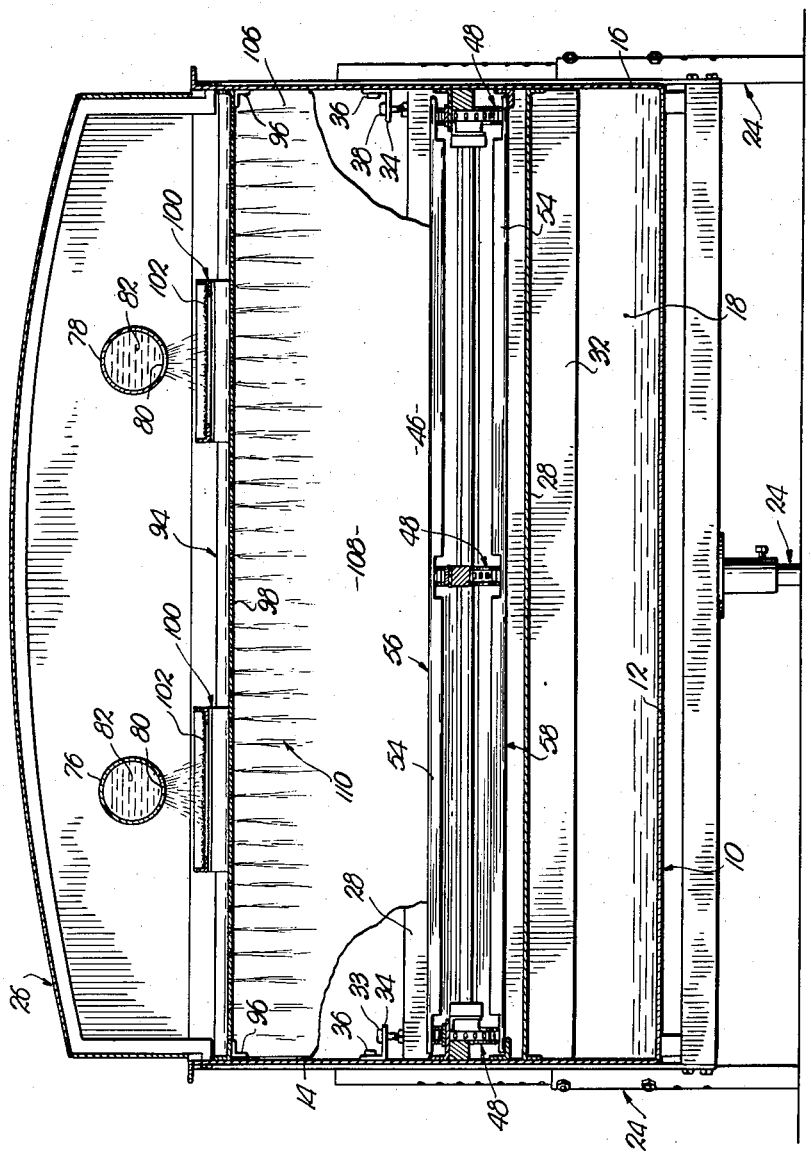

United States Patent Office 3,043,319
Patented July 10, 1962

3,043,319
APPARATUS FOR FREEZING FOOD PRODUCTS
Ralph S. Zebarth, Hickman Mills, Mo., assignor, by mesne assignments, to Gordon Johnson Company, Kansas City, Mo., a corporation of Missouri
Original application Dec. 16, 1957, Ser. No. 703,150, now Patent No. 3,006,774, dated Oct. 31, 1961. Divided and this application Aug. 4, 1958, Ser. No. 752,754
10 Claims. (Cl. 134—131)

This invention relates to the processing of foods and particularly to that phase of a food processing system having to do with the preparation of products such as vegetables, meat and fish for cold storage prior to delivery to ultimate distribution outlets.

This application is a division of my copending application Serial No. 703,150, filed December 16, 1957, now patent No. 3,006,774, for Method of Freezing Food Products.

It is the most important object of the present invention to provide an intermediate food handling process incident to, and as a part of, the subsequent freezing of the products during storage, which process contemplates what may be termed a "quick freeze" operation, primarily for the purpose of appearance, e.g., the presentation of an outermost, attractively glazed surface of uniform coloration throughout, looking of course, toward ultimate customer appeal.

An important object of the present invention, therefore, is to provide apparatus particularly useful in the preparation of frozen dressed meat, poultry and fish products, capable of quickly, properly and inexpensively freezing at least a portion or all of the products in a novel manner so that the surface thereof presents an attractive, sanitary and otherwise appealing appearance.

Another important object of the instant invention is to freeze the aforementioned meat and food products in a manner to eliminate discoloration incident to natural drainage of blood and other body fluids to the surface, which fluids would otherwise present a definite deterrent to purchase by the ultimate consumer.

Still another aim of the instant invention is to accomplish the aforementioned objects by bringing the food products into heat exchange relationship to a relatively non-toxic liquid maintained at a sufficiently low temperature to quickly freeze the products and to continue such operation until the surfaces thereof are frozen in a manner as described above to thereby present an attractive appearance.

Another aim of the present invention is to provide apparatus for freezing food products wherein a liquid coolant of low volatility and capable of being lowered to a relatively low temperature is employed for the aforementioned purposes, and which is flooded over the products for a predetermined period of time through use of distribution structure overlying the products and adapted to cause such liquid to gravitate continuously as the same are advanced horizontally in intersecting relationship to the gravitating fluid whereby the degree of freezing of the products may be carefully controlled.

A further aim of the present invention is to eliminate discoloration as aforementioned by also advancing the food products through a pool of such liquid, preferably flowing continuously in a direction opposite to the direction of travel of the products, and within which pool the lowermost areas of the products are carried through use of a conveyor or the like.

A still further aim of the present invention is to provide apparatus of the aforementioned character that permits performing successive steps of first advancing the products at the lowermost areas thereof through the cold liquid pool, thereupon continuing to advance the products through the gravitating liquid while a portion thereof remains partially immersed in the pool, and thereupon removing the products from the pool while continuing to pour the liquid thereover for a predetermined period of time to the end that by carefully correlating the temperature of the liquid, the speed of advancement of the products through the apparatus, and the flow rate of the liquid, the degree of freezing of the products may be varied as desired.

An important object also of the instant invention is to control the reverse flow of the liquid within the pool thereof so as to maintain a predetermined level partially immersing the food products, all through provision of novel valve means at one end of a shallow receptacle within which is disposed a continuous conveyor employed for advancing the products from one end of the apparatus to the other to thereby assure uniform freezing of the foods.

Numerous other objects in the details of construction of the apparatus will be made clear or become apparent as the following specification progresses.

In the drawings:

FIG. 1 is a plan view of apparatus for freezing food products and particular meats such as dressed poultry and constructed pursuant to the present invention, parts being broken away for clearness;

FIG. 2 is an elevational view thereof;

FIG. 3 is an appreciably enlarged, longitudinal, cross-sectional view taken on line 3—3 of FIG. 1;

FIG. 4 is a transverse, cross-sectional view taken on line 4—4 of FIG. 3; and

FIG. 5 is a fragmentary, enlarged, detailed, elevational view showing a portion of the valve control means for the liquid-receiving receptacle within which the food product conveyor of the machine operates.

The apparatus illustrated in the drawings and which is adapted for uniformly freezing various food products and in particular dressed meats such as poultry, includes a relatively long, narrow tank broadly designated by the numeral 10 and provided with a bottom 12, a pair of sides 14 and 16, front end wall 18 and rear end wall 20, the rear end of the tank 10 being offset downwardly as best seen in FIG. 3 to present a liquid-receiving chamber 22.

The entire tank 10 is supported by a plurality of leg means 24, each of which is vertically adjustable for leveling and adjusting purposes as will hereinafter become apparent. A hood 26 for the tank 10 spans the distance between the side walls 14 and 16 as seen in FIG. 4 and is substantially coextensive in length with the tank 10, except only at the ends of the latter as shown in FIGS. 1–3.

The sides 14 and 16 cooperate with a horizontal partition or drain pan 28 in presenting a relatively shallow receptacle 30 within the tank 10 that is substantially coextensive in length with the latter, but terminating at both ends thereof in spaced relationship to the end walls 18 and 20. The pan 28 which constitutes the bottom wall of receptacle 30 spans the distance between the side walls 14 and 16 and is affixed thereto as seen in FIG. 4. That end of the pan 28 adacent wall 18 extends beyond hood 26 as seen in FIGS. 1 to 3, but the opposite end of the pan 28 terminates an appreciable distance inwardly from that end of the hood 26 proximal to the end wall 20.

An upright gate or valve control means 32, spanning the distance between the walls 14 and 16, also forms a part of the receptacle 30 and is suspended from a pair of brackets 34 that are in turn vertically swingable on the walls 14 and 16 by virtue of pivots 36 which serve to mount the brackets 34 on the walls 14 and 16. Each bracket 34 has a fastener 38 for hanging the gate 32 therefrom and which is adjustable to vary the height of gate 32 as is apparent in FIGS. 3 and 4.

Gate 32 is also attached to the pan 28 and adjustable with respect thereto so as to vary the width of space or slot 40 between gate 32 and the proximal end edge of pan 28. This is accomplished through use of one or more chains or the like 42, as seen in FIGS. 3 and 5, which permit limited swinging movement of the gate 32 toward and away from the pan 28. Pan 28 has a plurality of spaced openings 44 therein for adjusting the point of attachment of the chain 42 thereto.

An endless flexible conveyor broadly designated by the numeral 46 is mounted in the tank 10 and carried by the side walls 14 and 16. More particularly, conveyor 46 is provided with a plurality of horizontally spaced chains 48 trained over spaced sprocket wheels 50 and 52 and interconnected by a number of spaced slats 54 presenting an uppermost flight 56 and a lowermost flight 58.

Conveyor 46 spans the distance between the walls 14 and 16 as seen in FIG. 4 and is substantially coextensive in length with the tank 10, extending from adjacent gate 32 to the end wall 20. The major portion of the length of both flights 56 and 58 of conveyor 46 is disposed within the receptacle 30 in parallelism with the pan 28, the latter of which slopes downwardly as the gate 32 is approached. However, flight 56 extends toward the end wall 20 beyond that end of pan 28 opposite to gate 32 as seen in FIG. 2. Also, it is to be noted that that part of flight 58 between pan 28 and end wall 20 is sloped downwardly and passes over transverse shaft and sprocket means 60 spaced outwardly beyond the proximal end of pan 28.

Accordingly, the flight 56 of conveyor 46 progressively slopes upwardly from gate 32 to the opposite end of pan 28 whereupon, as seen in FIG. 2, the slope of flight 56 increases appreciably in pitch as the sprockets 50 are approached.

A secondary conveyor 62 is provided at the discharge end of the apparatus as a continuation of the conveyor 46 and may consist of a plurality of spaced-apart belt and pulley means 64 horizontally disposed and overlying a catch basin 66 carried by wall 20 and extending outwardly therebeyond. As seen in FIG. 3, the basin 66 is provided with a valved outlet pipe 68 for draining the same of a liquid spray collected by basin 66 and emanating from a tubular spray head 72 overlying the conveyor 62.

The mechanism for driving the conveyors 46 and 62 at predetermined, variable and manually controlled rates of speed may be quite conventional, forms no part per se of the instant invention and is, therefore, broadly designated by the numeral 74.

A pair of elongated, tubular manifolds 76 and 78 are mounted within the hood 26 in any suitable manner, not shown, and extend substantially throughout the length of hood 26 in spaced-apart parallelism. The horizontally disposed manifolds 76 and 78 are provided with a plurality of spaced outlet slots 80 throughout the length thereof and a cold liquid 82 such as propylene glycol, ethylene glycol or a similar liquid coolant of low volatility and capable of being lowered to a relatively low temperature without solidifying, is continuously fed thereto through the medium of pumps 84 and 86 having their outlets coupled with the manifolds 76 and 78 intermediate the ends of the latter by pipes 88 and 90 respectively. The inlets of the pumps 84 and 86 communicate with compartment 22 of tank 10 through discharge openings 92 in the sides 14 and 16.

The distribution structure for the liquid 82 includes in addition to the manifolds 76 and 78 a plurality of side-by-side, elongated, transversely U-shaped, relatively shallow pans 94 that span the distance between the walls 14 and 16 and are loosely supported by brackets or the like 96 secured to the inner faces of the walls 14 and 16.

As seen in FIG. 3 the pans 94 extend throughout the lengths of the manifolds 76 and 78 and substantially throughout the length of the hood 26 terminating, therefore, short of the proximal ends of the conveyor 46. Each pan 94 is provided with a plurality of perforations 98 and each loosely carries a pair of open frames 100. A frame 100 is provided for each slot 80 respectively of each manifold 76 and 78 and is disposed beneath the corresponding slots 80 for receiving the liquid 82 emanating therefrom. All of such liquid 82 must pass through a foraminous panel such as screen wire 102 prior to collection within the pans 94 and uniform gravitational flow through the perforations 98 toward the conveyor flight 56. Screens 102 are rigidly fixed to frames 100 and held taut thereby horizontally between pans 94 and manifolds 76 and 78. Accordingly, frames 100 and the screens 102 thereof are disposed in end-to-end relationship in a pair of parallel rows throughout the length of the manifolds 76 and 78 as seen in FIG. 1.

The spray of liquid 82 emanating from the pans 94 is confined between the walls 14 and 16 and between a pair of resilient or flexible flaps 104 and 106 spanning the distance between the walls 14 and 16 and depending from the hood 26 to which they are attached at the ends of hood 26, flaps 104 and 106 terminating at the lowermost horizontal edges thereof adjacent the flight 56 of conveyor 46. Therefore, flaps 104 and 106 are spaced inwardly from the proximal ends of conveyor 46 and thus the proximal ends 18 and 20 respectively of tank 10.

During operation of the apparatus, mechanism 74 drives the conveyors 46 and 62 continuously in the same direction and at a predetermined rate of speed. Also, the pumps 84 and 86 operate continuously to recirculate the liquid 82 as the latter flows to the pumps 84 and 86 through openings 92 and is thereupon conveyed to the manifolds 76 and 78 via pipes 88 and 90.

Manifestly, the liquid 82 must be kept cold at all times during the operation of the apparatus, but the refrigerating means 99 to be used in conjunction therewith forms no part of the instant invention and, therefore, has not been detailed. In any suitable manner the liquid 82 may be caused to flow over evaporator coils of the refrigerating system 99, as for example, immediately prior to entering the pumps 84 and 86, or prior to flowing into the manifolds 76 and 78, all as may be desired. In any event, the temperature of the liquid 82 should be lowered to a level appreciably below the freezing point of the food products, the optimum temperature being within the range of 10° F. to 16° F., so that the heat contained within the same is rapidly removed as such products are brought into heat exchange relationship with liquid 82.

As above intimated, the process of the instant invention which may be followed through the use of apparatus shown in the drawings is especially adapted to be carried out after the food products have been completely enclosed within a suitable package or container, such as a bag of liquid-impervious material, for example one made from polyethylene, wax impregnated paper or cardboard, rubber latex bags, glass, or any other suitable packaging material.

The bags containing the food products are placed upon flight 56 of conveyor 46 at that end thereof adjacent the gate 32 and continually advanced thereby through the machine longitudinally thereof until the same are discharged onto the conveyor 62. The flap 106 readily yields as the packaged products enter the spray chamber which may be broadly designated by the numeral 108 and by the same token, the flap 104 will yield as illustrated in FIG. 3 when the products approach the discharge end of the machine.

Although the packaged product is not subjected to the spray 110 of liquid 82 emanating from pans 94 until the same pass the flexible gate 106, they are nonetheless subjected to the cold liquid 82 immediately upon being placed upon the conveyor 46. This is by virtue of the receptacle 30 and the way in which the same collects the liquid 82 and discharges the same into the tank 10 upon bottom 12 thereof at a predetermined rate by way of discharge slot 40.

The pool of liquid 82 collected within receptacle 30 will form a level extending from gate 32 above flight 56 to the opposite end of pan 28. Adjustment of the chain 42 to vary the width of the slot 40 determines the rate of flow of the liquid 82 from the receptacle 30 and adjustment of the fasteners 38 determines the height of gate 32 and, therefore, the point at which the liquid 82 overflows the upper edge of gate 32. Thus, the depth of the liquid pool in receptacle 30 is sufficient adjacent sprocket wheels 52 to completely immerse the proximal portions of both stretches 56 and 58 of conveyor 46 and extend thereabove for the reason that the level of the liquid pool is preferably coincident with the upper edge of gate 32. On the other hand, the depth of the liquid pool progressively decreases as the opposite end of the pan 28 is approached and, therefore, at that zone stretch 56 is spaced above the pool of liquid 82 in receptacle 30. It is to be understood that the major portion of stretch 56 within receptacle 30 is normally immersed in the liquid pool so that the lowermost portions of the food products are maintained under the liquid while being conveyed longitudinally of receptacle 30.

The instant apparatus is particularly advantageous in processing of poultry because when the birds are initially placed on the conveyor 46 in a warm condition, still containing an appreciable amount of body heat, blood and other body fluids obviously tend to drain therefrom and collect in the bottom of the bag. If such fluids are then frozen, the resultant package presents an unpleasing appearance and this problem is therefore eliminated by use of the instant apparatus. As soon as the poultry is placed on the conveyor 46 and moved into the pool of liquid 82 within receptacle 30, freezing of the lower areas of the birds commences immediately and continues throughout the time the poultry is partially immersed in the liquid 82 during travel toward the discharge end of the machine.

This presents, therefore, a finished product that has a glistening, fresh-like, sparkling glaze and, consequently, a palatable appearance by virtue of the fact that substantially the entire outer surface of the bird is uniformly frozen and the gelatin-like lymph forming a part of the meat freezes before the same has an opportunity to gravitate to the lowermost portion of the bird and thereby present an unsightly appearance.

As soon as the birds enter the chamber 108 they are subject to the flood of liquid 82 emanating from the pans 94, thereby quickly freezing those portions of the bird which extend above the level of the liquid 82 in the sump or pool of receptacle 30. It is seen, of course, that from the time the birds enter the chamber 108 until they are raised above the level of the pool in receptacle 30, they are subjected to a double action by virtue of the spray 110 and the partial immersion within the shallow pool.

The body heat is removed quickly from the poultry by virtue of the fact that the liquid and heat picked up thereby flows continuously toward the deep end of the pool in a direction opposite to the direction of travel of the birds and at the same time, the poultry is continuously subjected to fresh, cold liquid emanating from the pans 94. In other words, at no time is the poultry permitted to linger within liquid 82 whose temperature has been raised by the heat exchange operation and, therefore, the birds are frozen to a considerable depth within a period of time as short as thirty minutes from the time the same are initially placed on the conveyor 46 until they are discharged to the conveyor 62.

Furthermore, the use of the perforated pans 94 evenly distributes the liquid 82 throughout the chamber 108 and, therefore, throughout the time the packaged products are within the chamber 108 they are continually flooded with a relatively large amount of the liquid. The use of the flaps 104 and 106 is important because they cooperate with the hood 26 and the tank 10 in blocking entrance of air which would tend to lower the temperature of the gravitating liquid and the pool thereof within receptacle 30.

The use of the screens 102 is advantageous in that the same serve as aerators and tend to reduce splash so that the liquid 82 collects in the pans 94 and forms a level therein so that the liquid discharges uniformly from all of the perforations 98 at all times.

Finally, as the packaged products pass beyond the spray 110 and past the gate 104, the liquid 82 is permitted to drain from the bags and is collected by tank 10, as well as chamber 22 thereof, without waste before the products are discharged onto the conveyor 62.

A that point, they are subjected to the action of the water spray 70 which washes any trace of excess fluid 82 thereon.

As soon as the packages are discharged from the conveyor 64 and if the same have not been completely frozen by passage through the present apparatus, they are ready for subsequent processing operations which include packing for cold storage and completion of the freezing thereof more deeply into the central part of the products beyond the frozen area which has been formed as above described.

It is apparent that food products or any other substance which it is desired to freeze may be completely frozen by utilization of the present apparatus by merely varying the conditions under which the packaged products are advanced through the apparatus. Such complete freezing may be accomplished by slowing down the speed of advancement of the packages through the apparatus, by increasing the flow rate of coolant 82 or by lowering the temperature of liquid 82. By carefully correlating these three variables, the degree of freezing and the rate at which products are frozen by the present apparatus may be changed to suit the particular circumstances. For example, it has been determined that by merely slowing down the advancement of even large fowl such as turkeys to a velocity of 7½ feet per minute through the apparatus, complete freezing of the birds is obtained at the specified temperatures. Furthermore, the length of the apparatus may be changed to produce the desired results with a specific product.

Having thus described the invention what is claimed as new and desired to be secured by Letters Patent is:

1. A machine for lowering the temperature of products comprising a tank having a pair of sides and a pair of ends; an elongated, relatively shallow, liquid-receving receptacle in the tank having a flat, transversely horizontal bottom sloping downwardly toward one end of the receptacle, there being a liquid outlet in the receptacle at said one end thereof adjacent said bottom, the longitudinal edges of the bottom being attached to the sides of the tank whereby said bottom forms a partition in the tank, the ends of the receptacle being spaced inwardly from the corresponding ends of the tank, said receptacle having an upright end wall swingably suspended from said sides at said one end of the receptacle and spaced from the proximal end of the bottom, presenting said outlet between the end wall and the bottom; adjustable means limiting swinging movement of said end wall away from said end of the bottom; means for pouring a cold liquid into the receptacle to form a pool therein; and a continuous product conveyor having an uppermost flight extending and movable continuously longitudinally of the receptacle toward the opposite end of the latter, said flight being immersed in the pool below the level thereof throughout a major portion of the length of the receptacle whereby at least the lowermost area of the products resting on said flight are carried through the liquid in the pool as the products are advanced along the receptacle by said conveyor, said opposite end of the receptacle being open and said conveyor extending through said open end beyond the receptacle.

2. A machine for lowering the temperature of products comprising a tank having a pair of sides and a pair of ends; an elongated, relatively shallow, liquid-receiving receptacle in the tank having a flat, transversely horizontal bottom sloping downwardly toward one end of the receptacle, there being a liquid outlet in the receptacle at said one end thereof adjacent said bottom, the longitudinal edges of the bottom being attached to the sides of the tank whereby said bottom forms a partition in the tank, the ends of the receptacle being spaced inwardly from the corresponding ends of the tank, said receptacle having an upright end wall suspended from said sides at said one end of the receptacle and spaced from the proximal end of the bottom, presentign said outlet between the end wall and the bottom; means for raising and lowering said end wall to vary the height of said level of the pool; means for pouring a cold liquid into the receptacle to form a pool therein; and a continuous product conveyor having an uppermost flight extending and movable continuously longitudinally of the receptacle toward the opposite end of the latter, said flight being immersed in the pool below the level thereof throughout a major portion of the length of the receptacle whereby at least the lowermost area of the products resting on said flight are carried through the liquid in the pool as the products are advanced along the receptacle by said conveyor, said opposite end of the receptacle being open and said conveyor extending through said open end beyond the receptacle.

3. A machine for lowering the temperature of products comprising a tank having a pair of sides and a pair of ends; an elongated, relatively shallow, liquid-receiving receptacle in the tank having a flat, transversely horizontal bottom sloping downwardly toward one end of the receptacle, there being a liquid outlet in the receptacle at said one end thereof adjacent said bottom, the longitudinal edges of the bottom being attached to the sides of the tank whereby said bottom forms a partition in the tank, the ends of the receptacle being spaced inwardly from the corresponding ends of the tank, said receptacle having an upright end wall swingably suspended from said sides at said one end of the receptacle and spaced from the proximal end of the bottom, presenting said outlet between the end wall and the bottom; adjustable means limiting swinging movement of said end wall away from said end of the bottom; means for raising and lowering said end wall to vary the height of said level of the pool; means for pouring a cold liquid into the receptacle to form a pool therein; and a continuous product conveyor having an uppermost flight extending and movable continuously longitudinally of the receptacle toward the opposite end of the latter, said flight being immersed in the pool below the level thereof throughout a major portion of the length of the receptacle whereby at least the lowermost area of the products resting on said flight are carried through the liquid in the pool as the products are advanced along the receptacle by said conveyor, said opposite end of the receptacle being open and said conveyor extending through said open end beyond the receptacle.

4. A machine for lowering the temperature of edible products comprising an elongated tank; an elongated, relatively shallow, liquid-receiving receptacle in the tank and having an inclined bottom sloping toward one end of the receptacle and means at said one end of the receptacle for pooling liquid therein, the opposite end of the receptacle being open and located in spaced relationship to the proximal end of the tank; a continuous product conveyor within the tank and having an uppermost flight located above the bottom of the receptacle in a position to support products thereon and extending from adjacent said one end of the receptacle to a point adjacent the opposite end of the tank; means coupled to the conveyor for continuously driving the latter in a direction to cause the uppermost flight thereof to move away from said one end of the receptacle and toward said opposite end of the tank; and structure for pouring liquid at a temperature substantially below the initial temperature of the products, over the products positioned on the uppermost flight of the conveyor and throughout substantially the entire length and width of the conveyor, said structure including means for dividing the liquid directed onto the products into a plurality or relatively closely spaced, individual streams gravitating onto all exposed portions of the products, the liquid from said structure collecting in the receptacle to form said pool, said receptacle having means at said one end thereof for causing the liquid to pool in the receptacle to a predetermined height prior to draining from said one end of the tank whereby the liquid in the receptacle flows in a direction opposite to the movement of the conveyor, said means at said one end of the receptacle for pooling the liquid therein causing the liquid to be maintained in the receptacle at a sufficient height to effect immersion of a major portion of the length of the uppermost flight of the conveyor in the liquid to thereby cause the lower portions of the products to be immersed in the liquid pool throughout a substantial part of their path of travel longitudinally of the receptacle.

5. A machine as set forth in claim 4 wherein said receptacle is provided with means at said one end thereof defining an outlet for the liquid to permit selective control of the level of the liquid in the receptacle independently of the height of the means at said one end of the receptacle for pooling liquid therein.

6. A machine as set forth in claim 4 wherein the longitudinal edges of the bottom of the receptacle are attached to the side walls of the tank whereby the bottom forms a partition in the tank, the ends of the receptacle being spaced inwardly from corresponding ends of the tank, and the means at said one end of the receptacle for pooling liquid therein including an upright end wall suspended from said sides of the tank and spaced from the proximal end of the bottom of the receptacle to present a liquid outlet for controlling the liquid level in the receptacle.

7. A machine as set forth in claim 4 wherein said liquid structure includes an open bottom cooling chamber communicating with the receptacle and located above the latter, and means in the chamber for collecting liquid and effective to divide the latter into said individual streams for gravitation onto the products carried by said conveyor.

8. A machine as set forth in claim 7 wherein said liquid pouring structure includes horizontal, foraminous pan means partitioning said chamber above the conveyor and into which the liquid is discharged.

9. A machine as set forth in claim 8 wherein said liquid pouring structure includes horizontal, foraminous pan means partitioning said chamber above the conveyor, and an elongated screen spaced above the pan means and into which the liquid is discharged.

10. A machine as set forth in claim 8 wherein said liquid pouring structure includes horizontal, foraminous pan means partitioning said chamber above the conveyor, an elongated screen spaced above the pan means, and an elongated, liquid feeding manifold above the screen having spaced slots for flow of liquid to the screen.

References Cited in the file of this patent

UNITED STATES PATENTS

| | | |
|---|---|---|
| 545,429 | Lewis | Aug. 27, 1895 |
| 952,734 | Haller | Mar. 22, 1910 |
| 1,032,701 | Pope | July 16, 1912 |
| 1,390,268 | Beckett | Sept. 13, 1921 |
| 1,961,867 | Savage | June 5, 1934 |
| 2,128,028 | Hampton | Aug. 23, 1938 |
| 2,179,868 | Stebler | Nov. 14, 1939 |
| 2,182,927 | Matthews | Dec. 12, 1939 |
| 2,635,614 | Ford | Apr. 21, 1953 |
| 2,673,515 | Johnson | Mar. 30, 1954 |
| 2,745,419 | Slingerland | May 15, 1956 |